US012724697B2

(12) United States Patent
Kim et al.

(10) Patent No.: US 12,724,697 B2
(45) Date of Patent: Sep. 1, 2026

(54) APPARATUS AND METHOD FOR SIMULATION AUTOMATION IN REGRESSION TEST

(71) Applicant: SAMSUNG ELECTRONICS CO., LTD., Suwon-si (KR)

(72) Inventors: Jicheon Kim, Suwon-si (KR); Jinwoo Park, Suwon-si (KR); Yeonho Jeong, Suwon-si (KR); Seonil Brian Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 18/198,577

(22) Filed: May 17, 2023

(65) Prior Publication Data

US 2023/0385185 A1 Nov. 30, 2023

(30) Foreign Application Priority Data

May 31, 2022 (KR) ........................ 10-2022-0066916

(51) Int. Cl.
*G06F 11/3668* (2025.01)

(52) U.S. Cl.
CPC ...... *G06F 11/3684* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 7,512,839 B2 | 3/2009 | Coulter, Jr. et al. | |
| 8,478,575 B1 | 7/2013 | Kashai | |
| 10,891,219 B1 | 1/2021 | Dimitropoulos et al. | |
| 10,949,325 B1 | 3/2021 | Culibrk et al. | |
| 11,099,237 B2 | 8/2021 | Nochilur et al. | |
| 2010/0218049 A1* | 8/2010 | Mostow | G06F 11/3692 714/E11.029 |
| 2014/0282411 A1* | 9/2014 | Liemandt | G06F 11/3672 717/124 |
| 2019/0325090 A1* | 10/2019 | Muthiah | G06F 30/30 |
| 2020/0082034 A1* | 3/2020 | Sholingar | G06F 11/3698 |
| 2020/0089130 A1* | 3/2020 | Chao | G03F 7/7065 |

(Continued)

FOREIGN PATENT DOCUMENTS

KR 10-2153811 B1 9/2020

OTHER PUBLICATIONS

Khanna "WordPiece: Subword-based tokenization algorithm", Aug. 18, 2021, retrieved from <https://medium.com/towards-data-science/wordpiece-subword-based-tokenization-algorithm-1fbd14394ed7> on Feb. 4, 2025 (Year: 2021).*

(Continued)

*Primary Examiner* — Jason D Mitchell
(74) *Attorney, Agent, or Firm* — Sughrue Mion, PLLC

(57) ABSTRACT

A method of simulating an integrated circuit includes providing at least one test case to a simulation tool, obtaining at least one first simulation result and at least one first simulation log from the simulation tool, classifying, with a first machine learning model, the at least one test case into one fail class of a plurality of fail classes, generating at least one renewed test case by applying, with a controller, a solution to the at least one test case, and providing the at least one renewed test case to the simulation tool.

20 Claims, 12 Drawing Sheets

(56) References Cited

U.S. PATENT DOCUMENTS

| | | | | |
|---|---|---|---|---|
| 2020/0133830 | A1 | 4/2020 | Sharma et al. | |
| 2020/0159872 | A1* | 5/2020 | Hickerson | G06F 30/30 |
| 2020/0272559 | A1 | 8/2020 | Ahluwalia et al. | |
| 2020/0387760 | A1* | 12/2020 | Kamdar | G06F 18/2411 |
| 2021/0142222 | A1 | 5/2021 | Chang et al. | |
| 2021/0349811 | A1 | 11/2021 | Quemy | |
| 2022/0066747 | A1* | 3/2022 | Drain | G06N 3/045 |
| 2022/0390514 | A1* | 12/2022 | Winston | G01R 31/318357 |
| 2023/0032302 | A1* | 2/2023 | Lavagno | G06F 30/20 |
| 2023/0102185 | A1* | 3/2023 | Kostas | G06F 30/3312 716/136 |
| 2023/0128008 | A1* | 4/2023 | Clement | G06F 11/3684 717/124 |
| 2023/0419007 | A1* | 12/2023 | Muthiah | G06F 30/3308 |
| 2024/0012400 | A1* | 1/2024 | Tamaskar | G05B 19/41875 |
| 2024/0142960 | A1* | 5/2024 | Han | G05B 19/41875 |

OTHER PUBLICATIONS

"Machine Learning Based Efficient Regression Test Framework in Soc Verification", 58th DAC, Dec. 5-9, 2021, Virtual DAC: Dec. 13-31, 2021, https://www.dac.com/About/Conference-Archive/58th-DAC-2021, (108 pages total).

* cited by examiner

| Num | Test Attribute (510) | Label |
|---|---|---|
| 1 | cpu_sanity_test_c-data_check | Pass |
| 2 | pcie-clock_test_c-data_check-sleep | Fail |
| 3 | usb_power_test_c | Pass |
| ..... | ..... | ..... |
| 10000 | gpu-power_test_c-sleep-interrupt-mem_copy | Fail |

126 + 1537 + 3360 = 5023 fixed length

10000 × 5023 matrix representation

520

| | | | | | | | | | | | | |
|---|---|---|---|---|---|---|---|---|---|---|---|---|
| 1 | 0 | 1 | 0 | 1 | 1 | ... | 0 | 0 | 0 | 0 | 1 | 0 |
| 0 | 1 | 0 | 0 | 0 | 1 | ... | 1 | 1 | 0 | 0 | 0 | 0 |
| ... | ... | ... | ... | ... | ... | ... | ... | ... | ... | ... | ... | ... |
| 0 | 0 | 1 | 1 | 1 | 0 | ... | 1 | 1 | 0 | 0 | 0 | 1 |

APPARATUS AND METHOD FOR SIMULATION AUTOMATION IN REGRESSION TEST

CROSS-REFERENCE TO RELATED APPLICATION

This application is based on and claims priority under 35 U.S.C. § 119 to Korean Patent Application No. 10-2022-0066916, filed on May 31, 2022, in the Korean Intellectual Property Office, the disclosure of which is incorporated by reference herein in its entirety.

BACKGROUND

1. Field

The disclosure relates to a regression test, and more particularly, to an apparatus and method for simulation automation in regression testing.

2. Description of Related Art

Systems such as those that include integrated circuits are increasingly complicated, and moreover, a time and the cost for a verification process in developing a system are increasing. For example, a test set provided for system on chip (SOC) verification may include tens of thousands of test cases or more, and a time taken in a simulation may be long, such that a design of the system is changed before the testing is complete. Also, computing resources or personnel may be needed for simulating a number of test sets. Therefore, a verification method for reducing a time, computing resources, and personnel for a simulation in a regression test may be needed.

SUMMARY

One or more example embodiments provide an apparatus and method for simulation automation, which may decrease a time and the cost taken in performing a verification process by using a machine learning-based automation framework.

Additional aspects will be set forth in part in the description which follows and, in part, will be apparent from the description, or may be learned by practice of the presented embodiments.

According to an aspect of an example embodiment, a method of simulating an integrated circuit may include providing at least one test case to a simulation tool, obtaining at least one first simulation result and at least one first simulation log from the simulation tool, classifying, with a first machine learning model, the at least one test case into one fail class of a plurality of fail classes, generating at least one renewed test case by applying, with a controller, a solution to the at least one test case, and providing the at least one renewed test case to the simulation tool.

According to an aspect of an example embodiment, a system may include at least one memory storing instructions, and at least one processor configured to execute the instructions to provide at least one test case to a simulation tool, obtain at least one first simulation result and at least one first simulation log from the simulation tool, classify, with a first machine learning model, the at least one test case into one fail class of a plurality of fail classes, generate a renewed test case by applying, with a controller, a solution to the at least one test case, and provide the renewed test case to the simulation tool.

According to an aspect of an example embodiment, a non-transitory computer-readable storage medium may store instructions that, when executed by at least one processor, cause the at least one processor to provide at least one test case to a simulation tool, obtain at least one first simulation result and at least one first simulation log from the simulation tool, classify, with a first machine learning model, the at least one test case into one fail class of a plurality of fail classes, generate a renewed test case by applying, with a controller, a solution to the at least one test case, and provide the renewed test case to the simulation tool.

According to an aspect of the disclosure, there is provided a method of simulating an integrated circuit, the method including providing at least one test case to a simulation tool and obtaining at least one first simulation result and at least one first simulation log from the simulation tool, providing the at least one first simulation log to a first machine learning model to classify the at least one test case into one of a plurality of fail classes, applying, by using a controller, a solution to the at least one test case to generate at least one renewed test case, and providing the at least one renewed test case to the simulation tool.

According to another aspect of the disclosure, there is provided a system including at least one processor and a non-transitory storage medium configured to store instructions to allow at least one processor to perform a method of simulating an integrated circuit when being executed by the at least one processor, wherein the method includes providing at least one test case to a simulation tool and obtaining at least one first simulation result and at least one first simulation log from the simulation tool, providing the at least one first simulation log to a first machine learning model to classify the at least one test case into one of a plurality of fail classes, applying, by using a controller, a solution to the at least one test case to generate a renewed test case, and providing the renewed test case to the simulation tool.

According to another aspect of the disclosure, there is provided a non-transitory computer-readable storage medium including instructions, the instructions allowing at least one processor to perform a method of simulating an integrated circuit when being executed by the at least one processor, wherein the method includes providing at least one test case to a simulation tool and obtaining at least one first simulation result and at least one first simulation log from the simulation tool, providing the at least one first simulation log to a first machine learning model to classify the at least one test case into one of a plurality of fail classes, applying, by using a controller, a solution to the at least one test case to generate a renewed test case, and providing the renewed test case to the simulation tool.

BRIEF DESCRIPTION OF THE DRAWINGS

The above and other aspects, features, and advantages of certain example embodiments of the present disclosure will be more apparent from the following description taken in conjunction with the accompanying drawings, in which.

DETAILED DESCRIPTION

Figure 1:
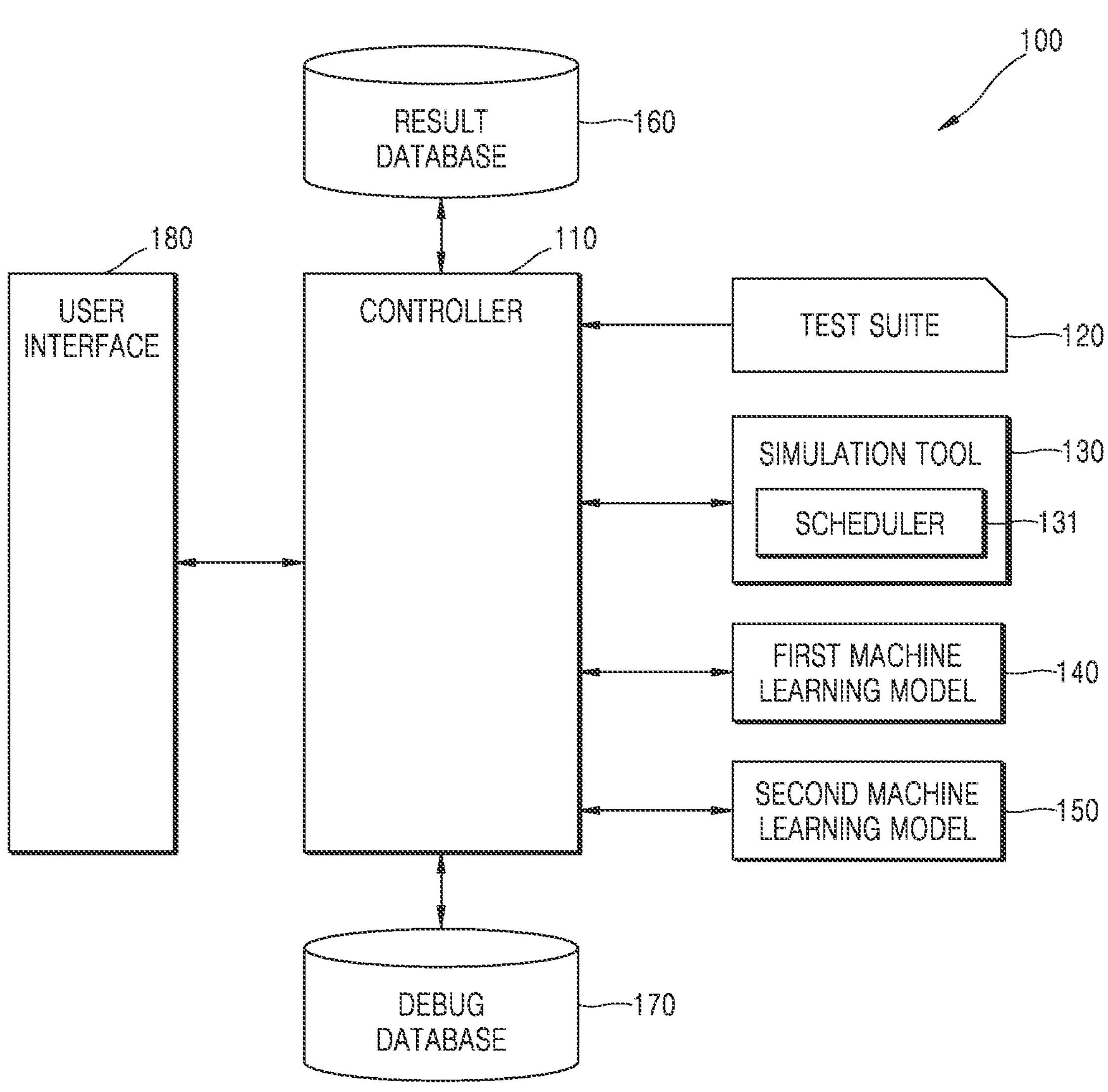
FIG. 1 is a diagram illustrating a regression test platform system according to an example embodiment.

FIG. 1 is a diagram illustrating a regression test platform system 100 according to an example embodiment. In FIG. 1, the regression test platform system 100 is briefly illustrated for describing example embodiments, and the example embodiments of the disclosure are not limited thereto. As illustrated in FIG. 1, the regression test platform system 100 may include a controller 110, a test suite 120, a simulation tool 130, a first machine learning model 140, a second machine learning model 150, a result database 160, a debug database 170, and a user interface 180.

The test suite 120 may provide at least one test case to the controller 110. In an example embodiment, the total number of test cases may be tens of thousands or more, and a test case may be represented as a test attribute. In example embodiments, a test attribute of a test case may include a target, a test class, and a function target. For example, the target may include a central processing unit (CPU), a graphics processing unit (GPU), a peripheral component interconnect express (PCIe), and a universal serial bus (USB) block, etc. The test class may include a sanity test, a clock test, a power test, etc. The function target may include data check, sleep, interrupt, etc.

The controller 110 may provide the at least one test case to the simulation tool 130, and may obtain a simulation log and a simulation result of the at least one test case from the simulation tool 130. In example embodiments, a simulation result of a provided test case may include a pass or a failure. When the simulation result is failure, the simulation tool 130 may provide a natural language-based simulation log together. For example, as described below with reference to FIG. 5, a natural language-based simulation log may include "data mismatch occur source data."

The result database 160 may store simulation results and simulation logs of one or more test cases. In example embodiments, the controller 110 may provide the result database 160 with a simulation log and a simulation result of a test case obtained from the simulation tool 130.

A user may obtain at least one simulation log from the controller 110 and the user interface 180 may visually provide the obtained simulation log to a user. The user interface 180 may receive at least one fail class and a solution to the at least one fail class input from the user. In example embodiments, the controller 110 may provide, via the user interface 180, simulation results and simulation logs of test cases from the result database 160, and the user interface 180 may visually provide the user with the simulation results and the simulation logs of the test cases. Also, the user, via the user interface 180, may perform debugging based on the simulation results and the simulation logs of the test cases. The user, via the user interface 180, may provide the system with a fail class and a solution to the fail class. For example, a fail class may include a data mismatch, and a solution to the fail class may include version management and a system-on design revision.

The debug database 170 may store at least one fail class and at least one solution to the at least one fail class. In example embodiments, the controller 110 may provide the debug database 170 with a fail class and a solution to the fail class, each of which may be provided by a user via the user interface 180.

The first machine learning model 140 may obtain at least one simulation log from the controller 110 and may classify test cases into one of a plurality of fail classes. Example embodiments of the first machine learning model 140 will be described below with reference to FIGS. 4 and 5.

The second machine learning model 150 may obtain at least one test case from the controller 110 and may predict a simulation result of the test case. Example embodiments of the second machine learning model 150 will be described below with reference to FIGS. 7 to 9.

Figure 2:
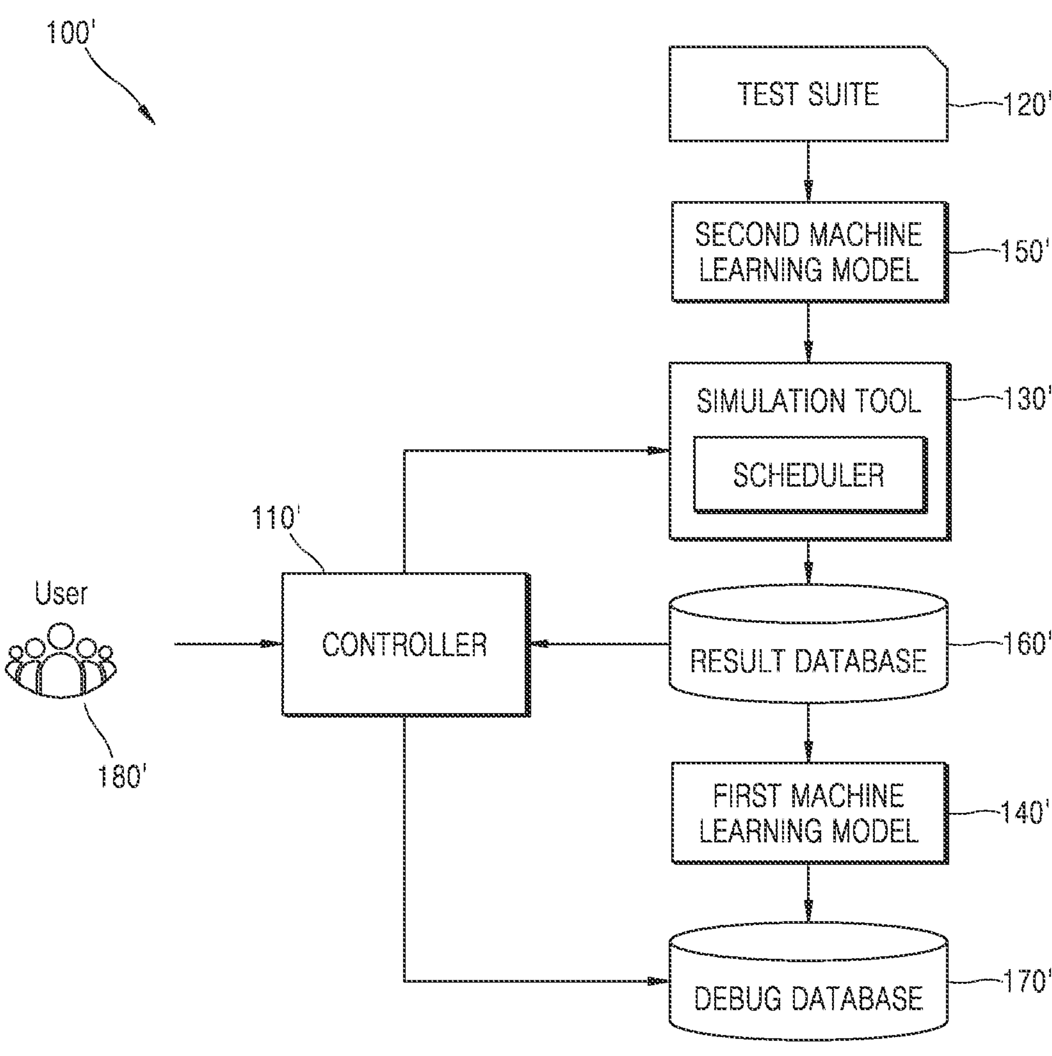
FIG. 2 is a diagram illustrating a regression test framework according to an example embodiment.
Figure 3:
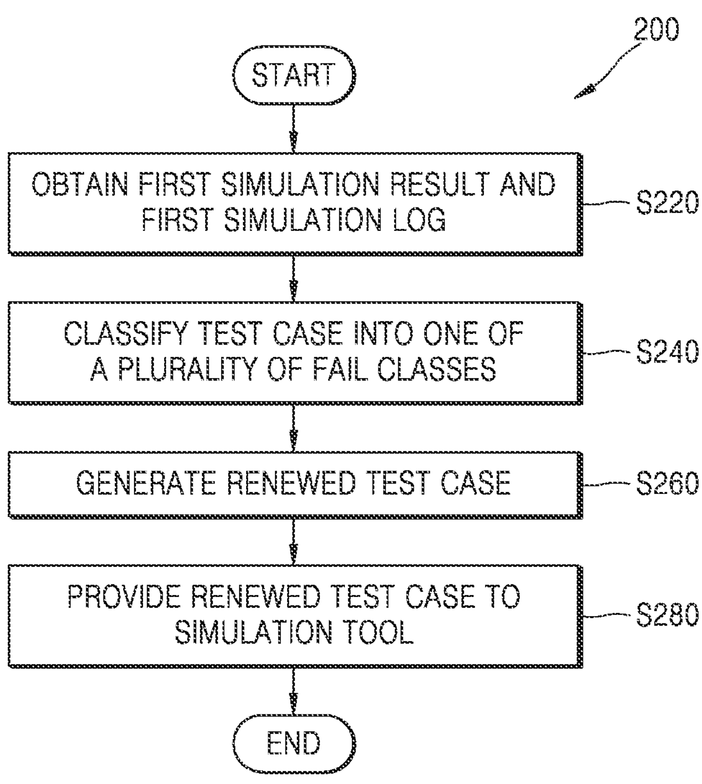
FIG. 3 is a flowchart illustrating a regression test method according to an example embodiment.

FIG. 2 is a diagram illustrating a regression test framework 100' according to an example embodiment. FIG. 3 is a flowchart illustrating a regression test method 200 according to an example embodiment. In example embodiments, the regression test framework 100' of FIG. 2 may be an example of the regression test platform system 100 of FIG. 1. As illustrated in FIG. 3, the regression test method 200 may include a plurality of operations S220 to S280.

Referring to FIGS. 1 to 3, in operation S220, a first simulation result and a first simulation log may be obtained. In example embodiments, a simulation tool 130' may receive at least one test case from a second machine learning model 150' and may generate at least one first simulation result and first simulation log based on the at least one test case. The at least one first simulation result and first simulation log may be stored in a result database 160'. A first machine learning model 140' may obtain the at least one first simulation result and first simulation log from the result database 160'.

In example embodiments, the controller 110 may provide at least one test case to the simulation tool 130 and may obtain the at least one first simulation result and first simulation log from the simulation tool 130.

In operation S240, test cases may be classified into one of a plurality of fail classes. The test cases may be classified into one of a plurality of fail classes using the first machine learning model 140'. In example embodiments, based on at least one first simulation log and a test case where at least one first simulation result obtained from the result database 160' fails, the first machine learning model 140' may output a probability of a plurality of fail classes of the test case. When the probability has a value that is the greater than or equal to a predetermined threshold probability value, the test case may be classified into a fail class. In example embodiments, when the probability has a value of 0.5 or more, the test case may be classified into a fail class corresponding to a maximum probability. In example embodiments, when the probability of the plurality of fail classes has a value of less than 0.5, the test case may be classified into a non-fail class.

In example embodiments, based on at least one first simulation log and a test case where at least one first simulation result obtained from the controller 110 fails, the first machine learning model 140 may output a probability of a plurality of fail classes of the test case, and when the probability has a value greater than or equal to a predetermined threshold probability value (e.g., a value of 0.5 or more in some embodiments), the test case may be classified into a fail class corresponding to a maximum probability. In example embodiments, when the probability of the plurality of fail classes has a value greater than or equal to a predetermined threshold probability value (e.g., a value of less than 0.5 in some embodiments), the test case may be classified into a non-fail class. Example embodiments are not limited to a value of a probability described above.

In operation S260, a renewed test case may be generated. In example embodiments, the controller 110 or 110' may receive a solution based on a fail class of a classified test case from the debug database 170 or 170' and may apply the solution to the test case to generate a renewed test case. In example embodiments, the solution may include version management and a system-on design revision.

In operation S280, the renewed test case may be provided to a simulation tool. In example embodiments, the controller 110 or 110' may provide the renewed test case to the simulation tool 130 or 130'.

In example embodiments, the first machine learning model 140 or 140' may automatically classify test cases into one of a plurality of fail classes, and when the controller 110 or 110' applies a solution based on a fail class to a test case to solve a problem of the test case, since additional debugging by a user 180' is not needed, a simulation may be automated, thereby reducing a time, computing resources, and personnel for a simulation in a regression test.

Herein, a machine learning model may have an arbitrary structure capable of being trained. For example, the machine learning model may include an artificial neural network, a decision tree, a support vector machine, a Bayesian network, and/or a genetic algorithm. Hereinafter, a machine learning model will be described with reference to an artificial neural network, but it may be noted that example embodiments are not limited thereto. In a non-limiting example embodiment, the artificial neural network may include deep neural network (DNN), convolution neural network (CNN), region with convolution neural network (R-CNN), region proposal network (RPN), recurrent neural network (RNN), stacking-based deep neural network (S-DNN), state-space dynamic neural network (S-SDNN), deconvolution network, deep belief network (DBN), restricted Boltzmann machine (RBM), fully convolutional network, long short-term memory (LSTM) network, classification network, which understand a natural language context. Herein, the machine learning model may be simply referred to as a model.

Figure 4:
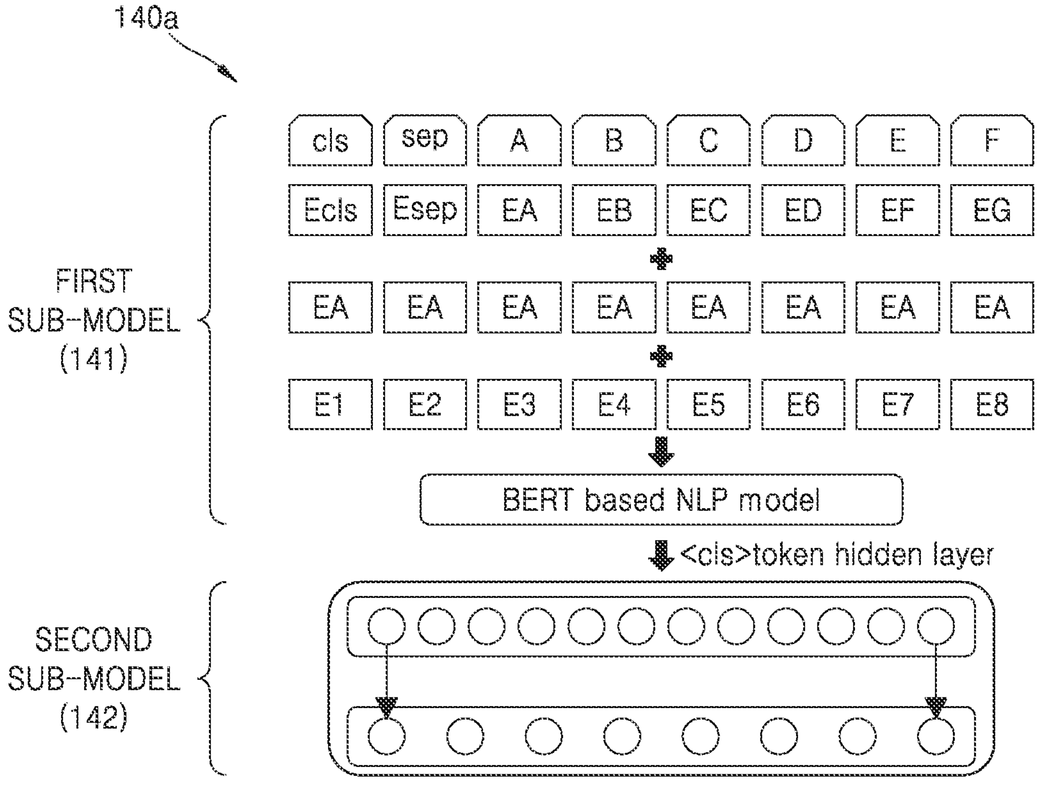
FIG. 4 is a diagram illustrating a first machine learning model according to an example embodiment.

FIG. 4 is a diagram illustrating a first machine learning model 140*a* according to an example embodiment. In example embodiments, the first machine learning model 140*a* of FIG. 4 may be an example of the first machine learning model 140 of FIG. 1. Referring to FIG. 4, the first machine learning model 140*a* may include a first sub-model 141 and a second sub-model 142.

The first sub-model 141 may be a model based on a transformer. In example embodiments, the first sub-model 141 may perform natural language processing by using at least one of bidirectional encoder representations from transformers (BERT), generative pre-trained transformer (GPT), XLNet, robustly optimized BERT pre-training approach (RoBERTa), embedding from language model (ELMo), a lite BERT (ALBERT), and text-to-text transfer transformer (T5). In example embodiments, the first sub-model 141 may include at least one of a byte pair encoding (BPE) algorithm and a wordpiece algorithm.

The second sub-model 142 may include a fully connected layer. In example embodiments, the second sub-model 142 may be added to an output unit of the first sub-model 141 in a fully connected layer form so as to enable multi-label classification. Fail classes of a test case may be represented by a probability based on an output of the first sub-model 141. The first machine learning model 140*a* may classify the test case into a fail class based on a probability values as described above.

Figure 5:
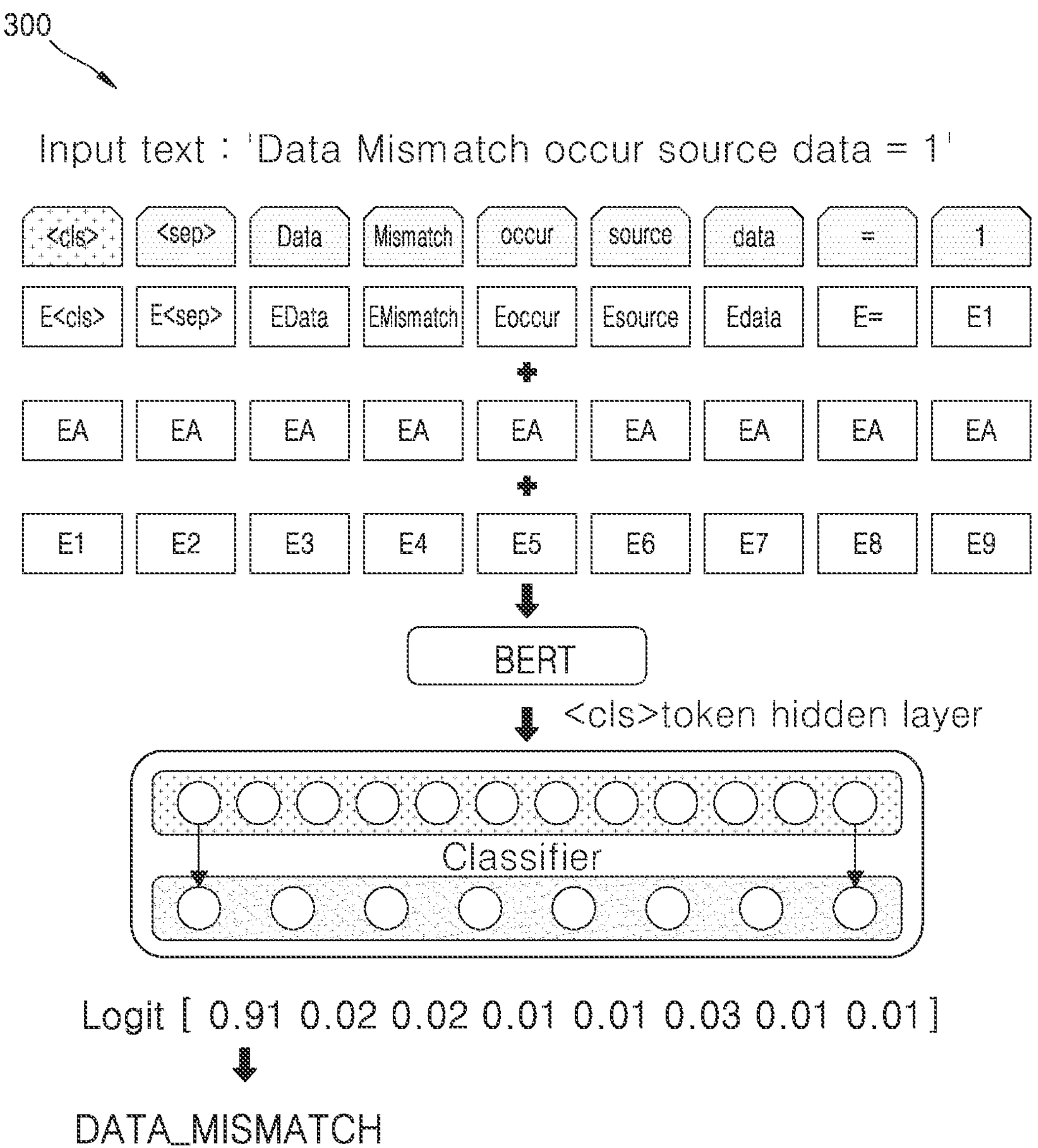
FIG. 5 is a diagram illustrating a method of classifying a test case into a fail class, according to an example embodiment.

FIG. 5 is a diagram illustrating a method 300 of classifying a test case into a fail class, according to an example embodiment. In example embodiments, the method 300 of classifying a failure class in FIG. 5 may be an example of a method of classifying a test case into fail class by using the first machine learning model 140*a* of FIG. 4.

Referring to FIGS. 1, 2, 4, and 5, the first sub-model 141 may generate first data from a simulation log. In example embodiments, the simulation tool 130' may receive at least one test case from the second machine learning model 150' and may generate a simulation log based on the received test case. The simulation log may be "Data Mismatch occur source data=1". The first sub-model 141 may tokenize a simulation log into "<cls>", "<sep>", "Data", "Mismatch", "occur", "source", "data", "=", and "1" by using a wordpiece tokenizer. First data may be generated from tokenized data based on BERT where a wordpiece embedding layer, a position embedding layer, a segment embedding layer, and at least one encoder are stacked. Example embodiments of the disclosure is not limited thereto.

In example embodiments, the simulation tool 130 may receive at least one test case from the controller 110 and may generate a simulation log based on the received test case. A subsequent process may be the same as described above.

The second sub-model 142 may output a probability of a test case to be classified into at least one fail class from the first data. In example embodiments, the second sub-model 142 may be coupled to the pre-trained first sub-model 141, and thus, may increase the accuracy of fail class classification through fine tuning which is an additional training process. In example embodiments, when one of probabilities of a test case to be classified into at least one fail class has a value of 0.5 or more, a test case may be classified into a fail class corresponding to a maximum probability, and when some or all of the probabilities of the test case to be classified into at least one fail class have a value of less than 0.5, a test case may be classified into a non-fail class (e.g., a pass class). It may be noted that example embodiments are not limited to a value of a probability described above. According to an example embodiment, when consistent simulation log information is provided as learning data to the first machine learning model 140*a*, the first machine learning model 140*a* may automatically classify eight test cases into fail classes based on the accuracy of 98%, thereby decreasing a time, computing resources, and personnel for a simulation in a regression test.

Figure 6:
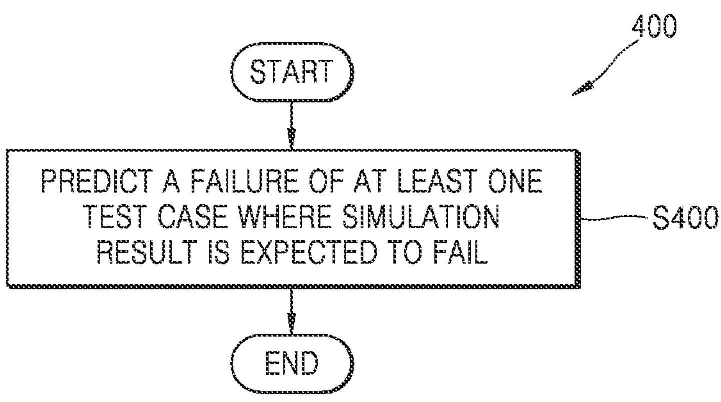
FIG. 6 is a flowchart illustrating a method of predicting a fail of a simulation result, according to an example embodiment.

FIG. 6 is a flowchart illustrating a method 400 of predicting a fail of a simulation result, according to an example embodiment. For example, the method 400 of predicting a fail of a simulation result in FIG. 6 may be performed before the regression test method 200 of FIG. 3 is performed.

Referring to FIGS. 1, 2, and 6, in operation S400, a failure of at least one test case, where a simulation result is expected to fail, may be predicted. In example embodiments, the second machine learning model 150' may receive a first test case set from the test suite 120' and may predict a failure of at least one test case, where a simulation result is expected to fail, of the first test case set.

In example embodiments, the controller 110 may receive a first test case set from the test suite 120 and may provide the first test case set to the second machine learning model 150, and the second machine learning model 150 may predict a failure of at least one test case where a simulation result is expected to fail, based on the first test case set.

In example embodiments, the second machine learning model 150 or 150' may automatically predict at least one test case where a simulation result of a test case set is expected to fail. In at least one test case where a simulation result is expected to pass, since debugging is not needed, a simulation tool may not be executed, and a simulation tool may be executed on only at least one test case where a simulation result is expected to fail, thereby decreasing a time, computing resources, and personnel for a simulation in a regression test.

Figure 7:
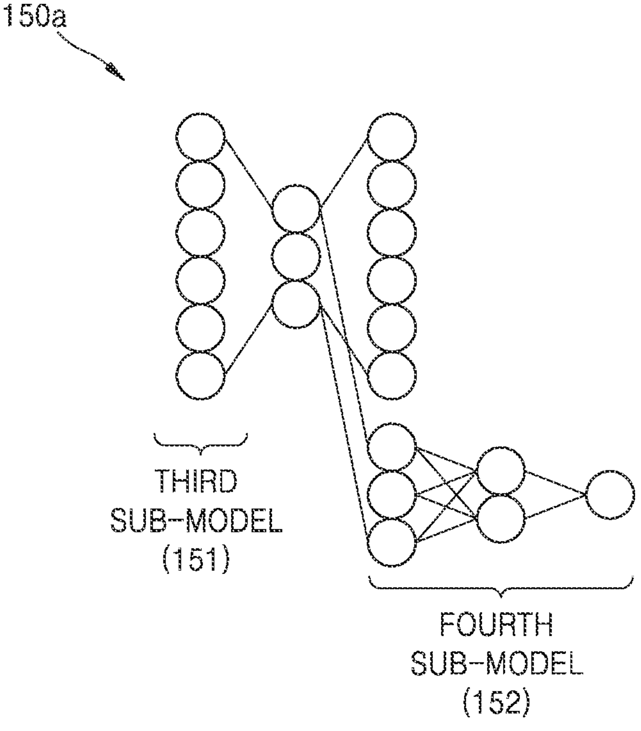
FIG. 7 is a diagram illustrating a second machine learning model according to an example embodiment.

FIG. 7 is a diagram illustrating a second machine learning model 150*a* according to an example embodiment. In example embodiments, the second machine learning model 150*a* of FIG. 7 may be an example of the second machine learning model 150 of FIG. 1. Referring to FIG. 7, the second machine learning model 150*a* may include a third sub-model 151 and a fourth sub-model 152.

The third sub-model 151 may vectorize an input having natural language to generate second data. In example embodiments, the third sub-model 151 may tokenize an input so as to vectorize the input having natural language, extract the input as a plurality of features based on a word, and assign a digit value such as the frequency number of word to the feature to express the feature as a vector value, thereby generating second data. In example embodiments, the third sub-model 151 may be a model based on at least one of bag of words (BOW), one-hot vector, N-gram, word2vec, latent semantic analysis (LSA), and Glove.

The fourth sub-model 152 may be a model based on logistic regression. In example embodiments, whether a simulation result of a test case fails may be represented by a probability based on the second data, and when a probability of whether a simulation result of a test case fails is greater than or equal to a threshold value, the fourth sub-model 152 may predict the test case as a test case where a simulation result fails.

In example embodiments, the fourth sub-model 152 may predict a test case where a simulation result fails, based on Equation (1).

$$H(x) = \frac{1}{1 + e^{-(wx+b)}} = \text{sigmoid}(wx + b) = \sigma(wx + b) \tag{1}$$

In Equation (1), w may denote a weight, and b may be a bias. A threshold value may vary based on a weight and a bias. A test case where a simulation result fails and which is predicted by the fourth sub-model 152 may be changed.

Figure 8:
FIG. 8 is a diagram illustrating a method of predicting a simulation result of a test case, according to an example embodiment.

FIG. 8 is a diagram illustrating an example of a method 500 of predicting a simulation result of a test case, according to an example embodiment. In example embodiments, the method 500 of predicting a simulation result of a test case in FIG. 8 may be an example of a method of predicting a simulation result of a test case by using the second machine learning model 150*a* of FIG. 7.

Referring to FIGS. 1, 2, 7, and 8, the third sub-model 151 may generate second data by using at least one test case as an input. In example embodiments, at least one test case may be received from the test suite 120' and may be represented as a test attribute 510, and a test attribute 510 may be represented as a target, a test class, and a function target. The test case may be one of cpu-sanity_test_c-data_check, pcie-clock_test_c-data_check-sleep, usb-power_test_c, and gpu-power_testc-sleep-interrupt-mem_copy, and the third sub-model 151 may generate the second data vectorized based on the test case. The second data may be represented by a matrix 520. All test attributes of test cases may be sorted. When one of test attributes is in a test case, this may be represented as 1, and when any one test attribute is not in a test case, this may be represented as 0. In example embodiments, the at least one test case may be received from the controller 110. A subsequent process may be the same as described above.

The fourth sub-model 152 may predict a simulation result of a test case based on the second data. In example embodiments, the controller 110 may receive (e.g., in operation S400 of FIG. 6) at least one test case, where a fail probability is high, from the fourth sub-model 152. The simulation tool 130 may receive at least one test case, where a fail probability is high, from the controller 110. A scheduler 131 may change a priority based on a fail probability and may preferentially execute the simulation tool 130 on a test case having a high fail probability.

In example embodiments, an accuracy may be higher in a case where a simulation result of at least one test case is predicted by using the second machine learning model 150*a*, rather than a case where a simulation result of at least one test case is predicted at random. Therefore, a priority for executing a simulation among all test cases may be accurately determined, and a time and computing resources for a simulation in a regression test may be reduced.

Figure 9:
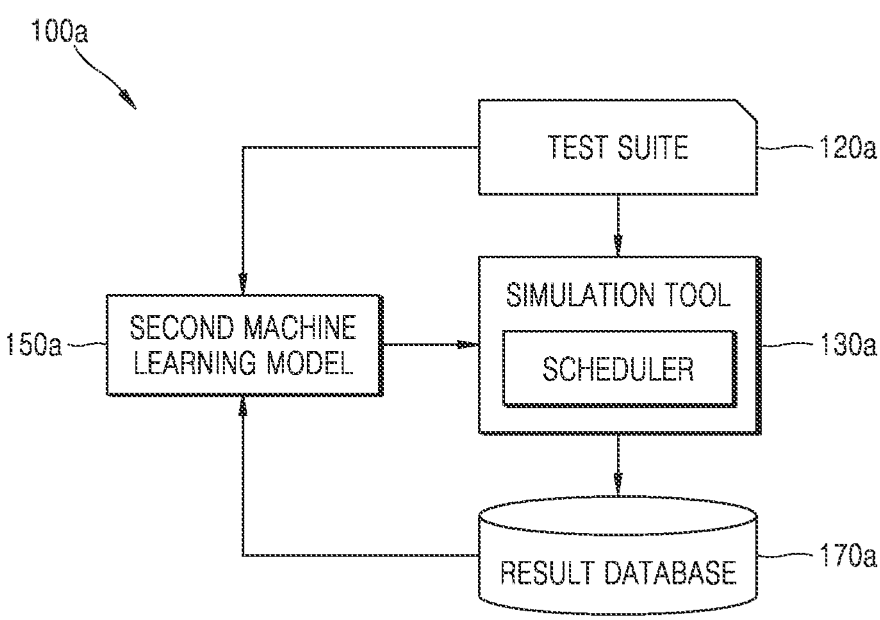
FIG. 9 is a diagram illustrating a framework training a second machine learning model, according to an example embodiment.
Figure 10:
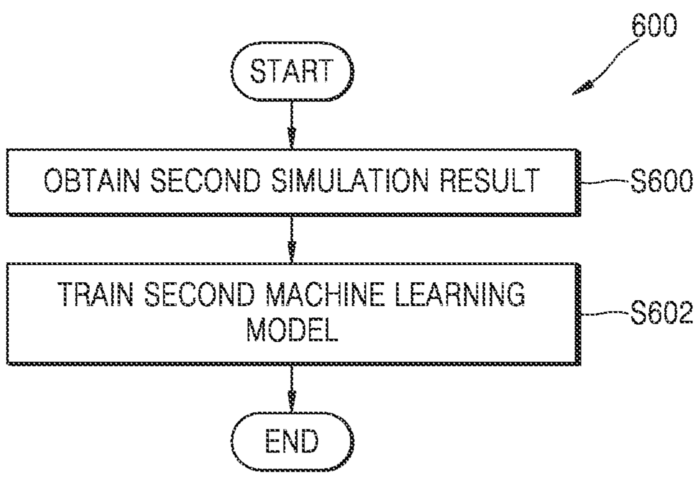
FIG. 10 is a diagram illustrating a method of training a second machine learning model, according to an example embodiment.

FIG. 9 is a diagram illustrating a framework 100*a* training a second machine learning model, according to an example embodiment. FIG. 10 is a diagram illustrating a method 600 of training a second machine learning model, according to an example embodiment. In example embodiments, a framework 100*a* training the second machine learning model of FIG. 9 may be an example of the regression test platform system 100 of FIG. 1. As illustrated in FIG. 10, the method 600 of training a second machine learning model in FIG. 10 may include a plurality of operations S600 and S602 and may be performed before the method 400 of FIG. 6 is performed.

Referring to FIGS. 1, 9, and 10, in operation S600, a second simulation result may be obtained. In example embodiments, the simulation tool 130*a* may receive a second test case set from the test suite 120*a* and may generate at least one second simulation result based on the second test case set. The result database 170*a* may receive the at least one second simulation result, and the second machine learning model 150*a* may obtain the second simulation result from the result database 170*a*.

In example embodiments, the controller 110 may provide a second test case to the simulation tool 130 and may obtain the at least one second simulation result from the simulation tool 130.

In operation S602, the second machine learning model may be trained. In example embodiments, the second machine learning model 150*a* may be trained based on the at least one second simulation result obtained from the result database 170*a* and the second test case set obtained from the test suite 120*a*. In example embodiments, the second machine learning model 150*a* may be trained based on the second test case and the second simulation result obtained from the controller 110.

In example embodiments, the second test case set may occupy 5% of a total test case, and the second machine learning model 150*a* may be trained by using a small test case, thereby reducing a time and computing resources for a simulation in a regression test.

Figure 11:
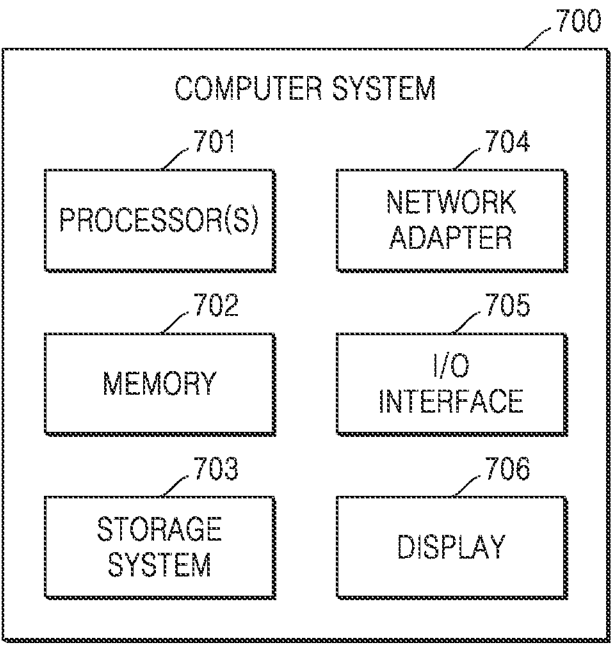
FIG. 11 is a diagram illustrating a computer system according to an example embodiment.

FIG. 11 is a diagram illustrating a computer system 700 according to an example embodiment. In example embodiments, the computer system 700 of FIG. 11 may perform training of a machine learning model used to classify test cases, described above with reference to the drawings, into one of a plurality of fail classes and a machine learning model used to predict a test case where a simulation result of a test case is expected to fail and may be referred to as a simulation automation system or a training system in a regression test.

The computer system 700 may be referred to as an arbitrary system including a general-use or special-purpose computing system. For example, the computer system 700 may include a personal computer, a server computer, a laptop computer, and home appliances. As illustrated in FIG. 11, the computer system 700 may include at least one processor 701, a memory 702, a storage system 703, a network adaptor 704, an input/output (I/O) interface 705, and a display 706.

The at least one processor 701 may execute program modules including a computer system-executable instruction. The program module may include routines, programs, objects, components, a logic, and a data structure, which perform a certain operation or implement a certain abstract data type. The memory 702 may include a computer system-readable medium of a volatile memory type such as random access memory (RAM). The at least one processor 701 may access the memory 702 and may execute instructions loaded into the memory 702. The storage system 703 may non-volatilely store information, and in example embodiments, the storage system 703 may include at least one program product including a program module which is configured to perform training of a machine learning model used to classify test cases, described above with reference to the drawings, into one of a plurality of fail classes and a machine learning model used to predict a test case where a simulation result of a test case is expected to fail. In a non-limiting embodiment, the program may include an operating system, at least one application, and the other program modules and program data.

The network adaptor 704 may provide an access to local area network (LAN), wide area network (WAN), and/or common network (for example, Internet). The I/O interface 705 may provide a communication channel with a peripheral device such as a keyboard, a pointing device, or an audio system. The display 706 may output various information so that a user recognizes the information.

In example embodiments, training of a machine learning model used to classify test cases, described above with reference to the drawings, into one of a plurality of fail classes and a machine learning model used to predict a test case where a simulation result of a test case is expected to fail may be implemented by a computer program product. The computer program product may include a non-transitory computer-readable medium (or storage medium) including computer-readable program instructions for enabling the at least one processor 701 to perform image processing and/or training of models. In a non-limiting embodiment, the computer-readable instruction may be an assembler instruction, an instruction set architecture (ISA) instruction, a machine instruction, a machine dependent instruction, a microcode, a firmware instruction, state configuration data, or a source code or an object code written in at least one programming language.

The computer-readable medium may be an arbitrary type of medium for non-temporarily retaining or storing instructions executed by the at least one processor 701 or an arbitrary instruction-executable device. The computer-readable medium may include an electronic storage device, a magnetic storage device, an optical storage device, an electromagnetic storage device, a semiconductor storage device, or an arbitrary combination thereof, but is not limited thereto. For example, the computer-readable medium may include a portable computer disk, a hard disk, RAM, read-only memory (ROM), electrically erasable read only memory (EEPROM), flash memory, static random access memory (SRAM), compact disk (CD), digital video disk (DVD), memory stick, floppy disk, a mechanically encoded device such as a punch card, or an arbitrary combination thereof.

Figure 12:
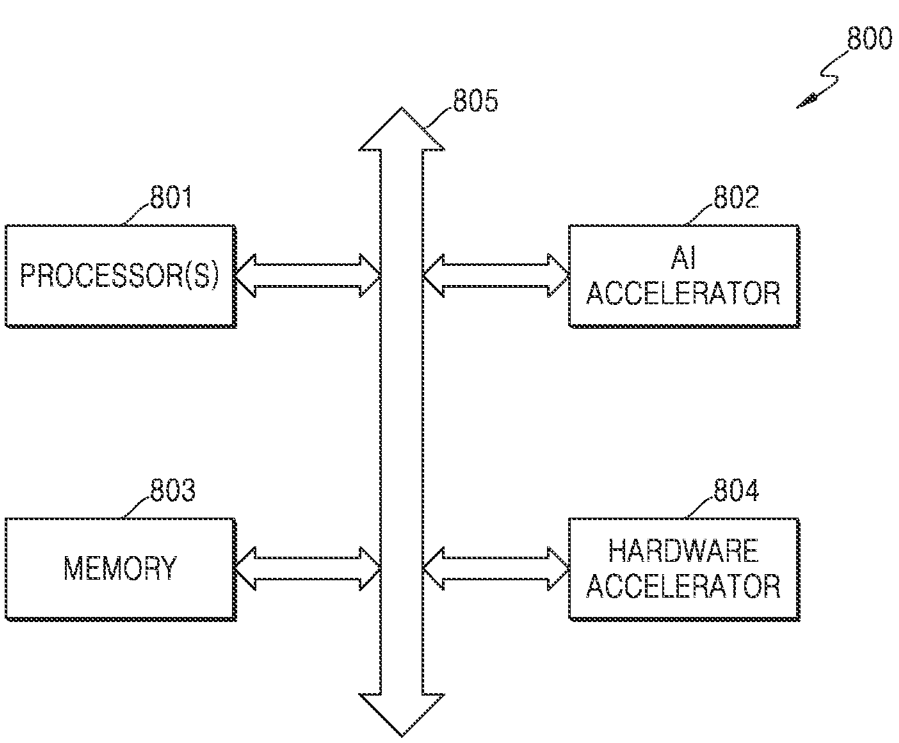
FIG. 12 is a diagram illustrating a system according to an example embodiment.

FIG. 12 is a diagram illustrating a system 800 according to an example embodiment. In example embodiments, a regression test according to an example embodiment may be executed by the system 800. Therefore, the system 800 may have low complexity and may quickly generate an accurate result.

Referring to FIG. 12, the system 800 may include at least one processor 801, a memory 803, an artificial intelligence (AI) accelerator 802, and a hardware accelerator 804, and the at least one processor 801, the memory 803, the AI accelerator 802, and the hardware accelerator 804 may communicate with one another through a bus 805. In example embodiments, the at least one processor 801, the memory 803, the AI accelerator 802, and the hardware accelerator 804 may be included in one semiconductor chip. Moreover, in example embodiments, at least two of the at least one processor 801, the memory 803, the AI accelerator 802, and the hardware accelerator 804 may be included in each of two or more semiconductor chips mounted on a board.

The at least one processor 801 may execute instructions. For example, the at least one processor 801 may execute instructions stored in the memory 803, and thus, may execute an operating system or may execute applications executed in the operating system. In example embodiments, the at least one processor 801 may execute instructions, and thus, may indicate an operation to the AI accelerator 802 and/or the hardware accelerator 804 and may obtain a performance result of the operation from the AI accelerator 802 and/or the hardware accelerator 804. In example embodiments, the at least one processor 801 may include an application specific instruction set processor (ASIP) customized for certain utility and may support a dedicated instruction set.

The memory 803 may have an arbitrary structure which stores data. For example, the memory 803 may include a volatile memory device such as dynamic random access memory (DRAM) or SRAM, or may include a non-volatile memory device such as resistive random access memory (RRAM). The at least one processor 801, the AI accelerator 802, and the hardware accelerator 804 may store, through the bus 805, data in the memory 803, or may read data from the memory 803.

The AI accelerator 802 may denote hardware designed for AI applications. In example embodiments, the AI accelerator 802 may include a neural processing unit (NPU) for implementing a neuromorphic structure, process input data provided from the at least one processor 801 and/or the hardware accelerator 804 to generate output data, and provide the output data to the at least one processor 801 and/or the hardware accelerator 804. In example embodiments, the AI accelerator 802 may be programmable and may be programmed by the at least one processor 801 and/or the hardware accelerator 804.

The hardware accelerator 804 may denote hardware designed to perform a certain operation at a high speed. For example, the hardware accelerator 804 may be designed to perform data conversion such as modulation, demodulation, encoding, or decoding at a high speed. In example embodiments, the hardware accelerator 804 may be programmable and may be programmed by the at least one processor 801 and/or the hardware accelerator 804.

In example embodiments, the AI accelerator 802 may execute machine learning models described above with reference to the drawings. For example, the AI accelerator 802 may execute a machine learning model used to classify test cases, described above with reference to the drawings, into one of a plurality of fail classes and a machine learning model used to predict a test case where a simulation result of a test case is expected to fail. The AI accelerator 802 may process an input parameter and a feature map to generate an output including useful information. Moreover, in example embodiments, at least some of models executed by the AI accelerator 802 may be executed by the at least one processor 801 and/or the hardware accelerator 804.

Hereinabove, exemplary embodiments have been described in the drawings and the specification. Embodiments have been described by using the terms described herein, but this has been merely used for describing the disclosure and has not been used for limiting a meaning or limiting the scope of the disclosure defined in the following claims. Therefore, it may be understood by those of ordinary skill in the art that various modifications and other equivalent embodiments may be implemented from the disclosure.

While the disclosure has been particularly shown and described with reference to embodiments thereof, it will be understood that various changes in form and details may be made therein without departing from the spirit and scope of the following claims.

What is claimed is:

1. A method of simulating an integrated circuit, the method comprising:

providing at least one test case to a simulation tool;

obtaining at least one first simulation result and at least one first simulation log from the simulation tool;

outputting, with a first machine learning model, a probability that the at least one test case is to be classified into at least one fail class;

classifying, with the first machine learning model, the at least one test case into one fail class of a plurality of fail classes based on the probability that the at least one test case is to be classified into at least one fail class being greater than a predetermined threshold probability value;

generating at least one renewed test case by applying, with a controller, a solution to the at least one test case; and providing the at least one renewed test case to the simulation tool.

2. The method of claim 1, further comprising:

providing a first test case set to a second machine learning model; and predicting, with the second machine learning model, at least one test case of the first test case set where a simulation result is expected to fail.

3. The method of claim 2, further comprising:

generating, with the simulation tool, a second simulation result based on a second test case set; and training the second machine learning model based on the second test case set and the second simulation result.

4. The method of claim 2, wherein the second machine learning model comprises a third sub-model configured to:

receive the first test case set;

vectorize the first test case set; and generate second data based on the vectorized first test case set.

5. The method of claim 4, wherein the first test case set comprises at least one attribute, and wherein the at least one attribute comprises a target, a test class, and a function target.

6. The method of claim 4, wherein the second machine learning model comprises a fourth sub-model configured based on logistic regression and configured to determine whether a simulation result of the first test case set fails or passes based on the second data.

7. The method of claim 1, wherein the first machine learning model comprises a first sub-model configured to:

receive the at least one first simulation log;

tokenize the at least one first simulation log, and generate first data based on the tokenized at least one first simulation log.

8. The method of claim 7, wherein the first sub-model comprises:

a model based on a transformer, and at least one of a byte pair encoding (BPE) algorithm and a wordpiece algorithm.

9. The method of claim 7, wherein the first machine learning model further comprises a second sub-model comprising a fully connected layer and configured to receive the first data from the first sub-model and output the probability of the at least one test case to be classified into at least one fail class based on the first data.

10. The method of claim 9, wherein the at least one fail class comprises a data mismatch occurring in source data.

11. The method of claim 1, wherein the at least one fail class comprises a data mismatch, and the solution comprises at least one of version management and a system-on design revision based on the data mismatch.

12. A system comprising:

at least one memory storing instructions; and at least one processor configured to execute the instructions to:

provide at least one test case to a simulation tool;

obtain at least one first simulation result and at least one first simulation log from the simulation tool;

output, with a first machine learning model, a probability that the at least one test case is to be classified into at least one fail class;

classify, with the first machine learning model, the at least one test case into one fail class of a plurality of fail classes based on the probability that the at least one test case is to be classified into at least one fail class being greater than a predetermined threshold probability value;

generate a renewed test case by applying, with a controller, a solution to the at least one test case; and provide the renewed test case to the simulation tool.

13. The system of claim 12, wherein the at least one processor is further configured to execute the instructions to:

provide a first test case set to a second machine learning model; and predict, with the second machine learning model, at least one test case of the first test case set where a simulation result is expected to fail.

14. The system of claim 13, wherein the at least one processor is further configured to execute the instructions to:

generate, with the simulation tool, a second simulation result based on a second test case set; and train the second machine learning model based on the second test case set and the second simulation result.

15. The system of claim 13, wherein the second machine learning model comprises:

a third sub-model configured to:

receive the first test case set;

vectorize the first test case set; and generate second data based on the vectorized first test case set; and a fourth sub-model configured based on logistic regression and configured to determine whether a simulation result of the first test case set fails or passes based on the second data.

16. The system of claim 12, wherein the first machine learning model comprises:

a first sub-model configured to:

receive the at least one first simulation log;

tokenize the at least one first simulation log; and generate first data based on the tokenized at least one first simulation log; and a second sub-model comprising a fully connected layer, the second sub-model configured to receive the first data from the first sub-model and output the probability of the at least one test case to be classified into at least one fail class based on the first data.

17. A non-transitory computer-readable storage medium storing instructions that, when executed by at least one processor, cause the at least one processor to:

provide at least one test case to a simulation tool;

obtain at least one first simulation result and at least one first simulation log from the simulation tool;

output, with a first machine learning model, a probability that the at least one test case is to be classified into at least one fail class;

classify, with the first machine learning model, the at least one test case into one fail class of a plurality of fail classes based on the probability that the at least one test case is to be classified into at least one fail class being greater than a predetermined threshold probability value;

generate a renewed test case by applying, with a controller, a solution to the at least one test case; and provide the renewed test case to the simulation tool.

18. The non-transitory computer-readable storage medium of claim 17, wherein the instructions, when executed by the at least one processor, further cause the at least one processor to:

provide a first test case set to a second machine learning model, and predict, with the second machine learning model, at least one test case of the first test case set where a simulation result is expected to fail.

19. The non-transitory computer-readable storage medium of claim 18, wherein the second machine learning model comprises:

a third sub-model configured to:

receive the first test case set;

vectorize the first test case set; and generate second data based on the vectorized first test case set; and a fourth sub-model configured based on logistic regression and configured to determine whether a simulation result of the first test case set fails or passes based on the second data.

20. The non-transitory computer-readable storage medium of claim 17, wherein the first machine learning model comprises:

a first sub-model configured to:

receive the at least one first simulation log;

tokenize the at least one first simulation log; and generate first data based on the tokenized at least one first simulation log; and a second sub-model comprising a fully connected layer, the second sub-model being configured to receive the first data from the first sub-model and output the probability of the at least one test case to be classified into at least one fail class based on the first data.

* * * * *